(12) United States Patent
Elford et al.

(10) Patent No.: US 8,488,747 B1
(45) Date of Patent: Jul. 16, 2013

(54) MODIFIED PROTECTOR MODULE WITH AN INTEGRATED SPLITTER

(75) Inventors: Michael L. Elford, Calhoun, LA (US);
Pete Kawamoto, Centennial, CO (US);
Diana Unser, Lakewood, CO (US);
Warren Novak, Northglenn, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/529,712

(22) Filed: Jun. 21, 2012

(51) Int. Cl.
*H04M 1/24* (2006.01)
(52) U.S. Cl.
USPC ........................................ 379/27.05; 361/119
(58) Field of Classification Search
USPC .............. 379/27.05, 93.05, 106.04, 166, 331, 379/387.01, 412; 361/119; 370/352, 401
See application file for complete search history.

(56) References Cited

U.S. PATENT DOCUMENTS

| 6,738,474 | B1 * | 5/2004 | Miller ...................... 379/413.03 |
| 7,268,993 | B2 * | 9/2007 | Dement ........................ 361/119 |
| 2003/0043997 | A1 * | 3/2003 | Witty et al. .............. 379/399.01 |
| 2006/0133351 | A1 * | 6/2006 | Adolfsson ...................... 370/352 |
| 2010/0098059 | A1 * | 4/2010 | Reed et al. .................... 370/352 |
| 2012/0188677 | A1 * | 7/2012 | Yu et al. ....................... 361/93.9 |

\* cited by examiner

*Primary Examiner* — Olisa Anwah
(74) *Attorney, Agent, or Firm* — Patton Boggs LLP

(57) ABSTRACT

The disclosed embodiments include a surge protection module that includes an integrated signal splitter configured to combine a signal from a DSL tip wire with a signal from the POTS tip pin to generate a DSL/POTS tip output signal, and combine a signal from a DSL ring wire with a signal from the POTS ring pin to generate a DSL/POTS ring output signal. The integrated signal splitter is configured to be in electrical communication with an overvoltage protection component and to output the DSL/POTS tip output signal and the DSL/POTS ring output signal to the overvoltage protection component.

13 Claims, 6 Drawing Sheets

MODIFIED PROTECTOR MODULE WITH AN INTEGRATED SPLITTER

BACKGROUND OF THE INVENTION

1. Field of the Invention

The present invention relates generally to systems and methods for providing communications, and more particularly to a surge protector module utilized in the telecommunication industry.

2. Discussion of the Related Art

The National Electric Code requires the telephone industry to provide electrical surge protection at the point of entry where copper wires enter a building. The code requires that telephone equipment within the building be protected from three types of electrical hazards: 1) surge protection from lightning and switching surges; 2) over current protection; and 3) circuit lock-out protection for use in the event a disturbance remains on the circuit for an extended period of time.

The required protection is provided by installing a building entrance panel at the point where the outside lines enter the building. The panel includes a surge protection module for each telephone circuit in the building so that each interior telephone circuit is protected from external electrical disturbances.

The disclosed embodiments seek to provide solutions or improvements to one or more shortcomings associated with current surge protection modules.

SUMMARY OF THE INVENTION

The disclosed embodiments include a surge protection module designed to reduce noise that affects digital subscriber line (DSL) service. For example, in one embodiment, a surge protector module includes an overvoltage protection component, a ground pin in electrical communication with the overvoltage protection component, a pair of outside plant tip and ring pins in electrical communication with the overvoltage protection component, and a pair of plain old telephone service (POTS) tip and ring pins. The surge protector module is configured to receive a wire wrap pair consisting of a digital subscriber line (DSL) tip wire and a DSL ring wire. The surge protector module also includes an integrated signal splitter configured to receive the signals from the DSL tip wire, the DSL ring wire, and the POTS tip and ring pins. The integrated signal splitter is configured to combine a first signal from the DSL tip wire with a second signal from the POTS tip pin to generate a DSL/POTS tip output signal, and combine a third signal from the DSL ring wire with a fourth signal from the POTS ring pin to generate a DSL/POTS ring output signal. The integrated signal splitter is configured to be in electrical communication with the overvoltage protection component and to output the DSL/POTS tip output signal and the DSL/POTS ring output signal to the overvoltage protection component.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
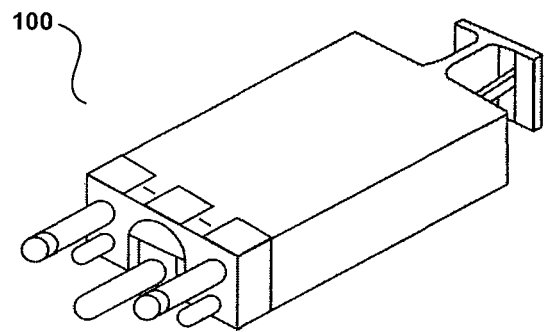
FIG. 1 illustrates an example of a typical surge protection module.

Beginning with FIG. 1, an example of a typical surge protection module 100 is depicted. The surge protection module 100 is designed to provide power fault/overvoltage protection for most standard telephone line applications (i.e., plain old telephone service (POTS)). POTS is the voice-grade telephone service that remains the basic form of residential and small business service connection to the telephone network in many parts of the world.

The surge protection module 100 has an industry-standard 5-pin configuration for use in central and remote office connector blocks as well as building entrance terminals. The surge protection module 100 may be configured using different types of technology for providing surge protection including, but not limited to, as a solid-state overvoltage protector (SSOVP) module and as a gas tube overvoltage protector module. The surge protection module 100 is designed to short to ground (also known as a "fail-safe event") when an electrical surge exceeds the capability of the SSOVP device or gas tube. In some embodiments, the surge protection module 100 may also include a heat coil to protect digital equipment line cards against overheating caused by prolonged currents.

As will be further explained, two of the pins of the surge protection module 100 are in electrical communication with the customer's telephones (typically referred to in the industry as outside plant (O.P.) tip and ring) and another two pins are in electrical communication with devices of a service provider (typically referred to in the industry as a central office (CO) tip and ring). The fifth pin a ground pin. "Tip" and "Ring" are common terms in the telephone service industry referring to the two wires or sides of an ordinary telephone line. Tip is the ground side (positive) and Ring is the battery (negative) side of a phone circuit. The ground side is common with the central office of the telephone company and the battery side carries −48 volts of DC voltage when in an "idle" or "on hook" state. The combination of tip and ring, then, makes up a normal phone line circuit. To ring the phone to alert to an incoming call, about 90 volts of 20 Hz AC current is superimposed over the DC voltage already present on the idle line.

Figure 2:
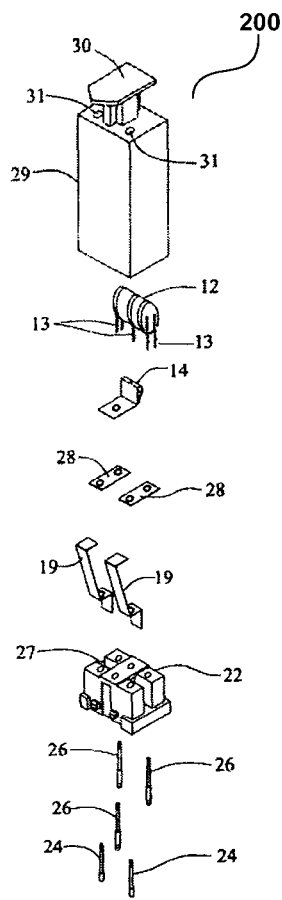
FIG. 2 illustrates an example of an exploded perspective view of the internal components of the surge protection module of FIG. 1.

FIG. 2 illustrates an example of an exploded perspective view of the internal components of a surge protection module 200. In the depicted embodiment, the surge protection module 200 incorporates a gas tube surge protector 12 having electrically conductive leads 13, a fail-safe device 14, spring clips with test point contacts 19, pin block 22, short pins 24 and long pins 26.

A protector housing 29 provides a cover for the internal components of a surge protection module 200. The protector housing 29 includes a handle 30. The handle 30 provides a means for installing and removing the surge protection module 200 from a central office rack mount protector block. In one embodiment, the protector housing 29 made of self-extinguishing thermoplastic that provides a fire barrier. The protector housing 29 may also include apertures 31 to enable contact by test instruments with test point spring clips 19 for performing testing of the equipment.

Pin block 22 has a plurality of bores 27 for receiving the respective narrow necks of the pins. A pair of bridge shunt bars 28 provides electrical communication between short pins 24 and long pins 26. Contacts 13 of gas tube 12 are then brought into electrical engagement with respective tops of preselected pins. In one embodiment, short pins 24 are in electrical communication with customer equipment and long pins 26 are in electrical communication with devices of a service provider. Alternatively, in other embodiments, short pins 24 are in electrical communication with devices of a service provider and long pins 26 are in electrical communication with customer equipment. The fail safe device 14 is designed to short out the circuit to prevent long duration fault currents from reaching customer equipment.

Figure 3:
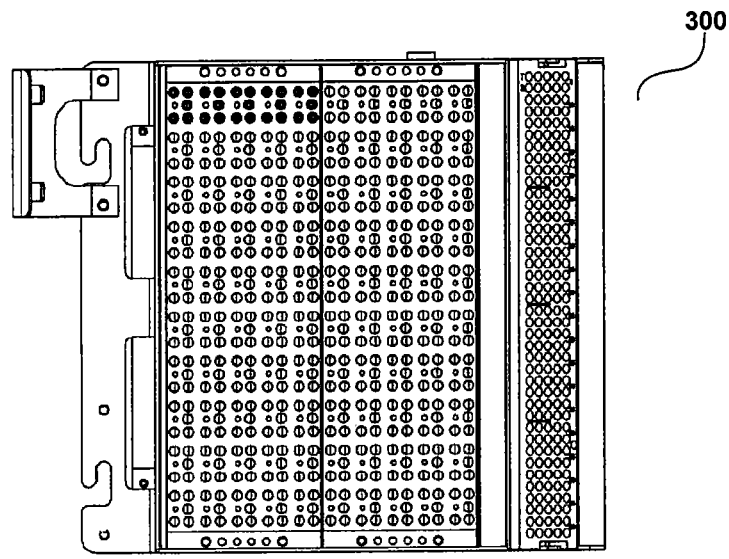
FIG. 3 illustrates an example of a central office rack mount protector block.
Figure 4:
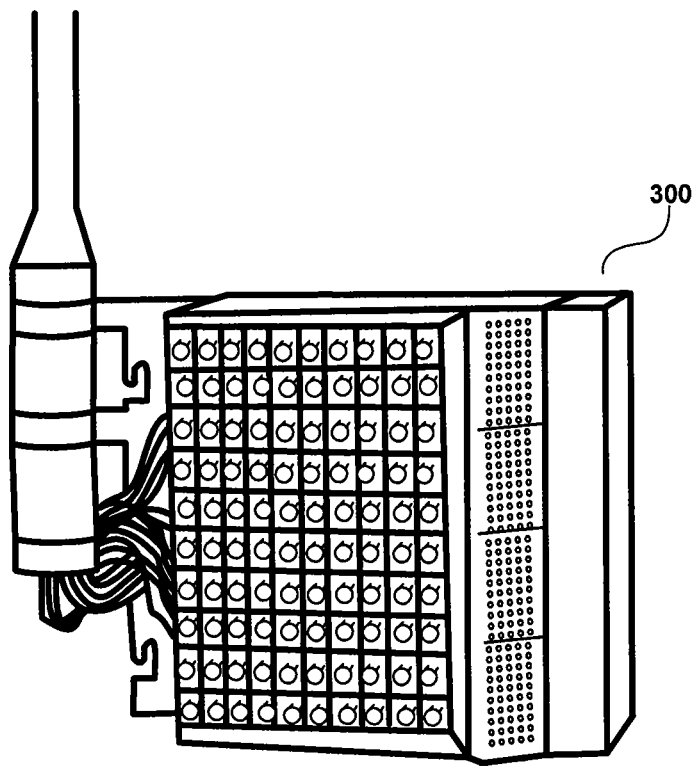
FIG. 4 is a picture illustrating the central office rack mount protector block of FIG. 3 having surge protection modules inserted therein.

FIG. 3 illustrates an example of a central office rack mount protector block 300. The central office rack mount protector block 300 is designed to accept 100 of the industry standard 5 Pin surge protection modules, as described above, for completing the connection between the CO equipment lines and the outside plant (O.P.) lines. Multiple ones of the central office rack mount 300 are typically mounted to a central office protector frame 950, as illustrated in FIG. 9. A typical central office protector frame may be several feet tall and several feet wide (e.g., 6 ft. tall by 5 ft. wide). FIG. 4 is a picture illustrating the central office rack mount protector block 300 with surge protection modules inserted therein.

Figure 5:
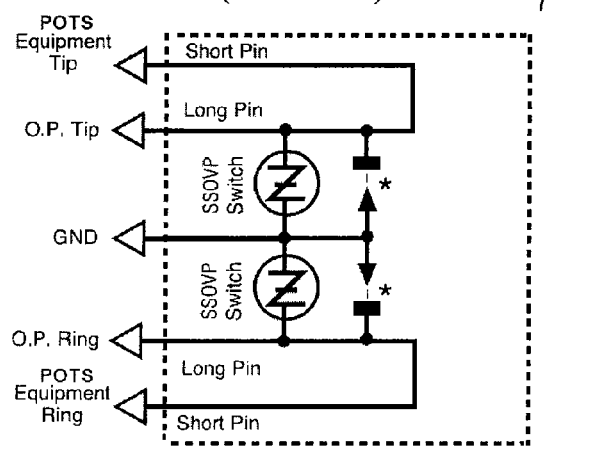
FIG. 5 illustrates an example of a circuit diagram of the typical surge protection module of FIG. 1.

FIG. 5 illustrates an example of a circuit diagram of a solid-state overvoltage protector (SSOVP) module 500 for use in central office connector (e.g., central office rack mount protector block 300), remote and building entrance terminal applications. The solid-state overvoltage protector (SSOVP) module 500 has five contact pins. When inserted into the connector sockets of a central office rack mount protector block, contact pins provide the following connections for each cable pair: protection ground that also acts as a polarization pin, tip and ring to the outside plant cable via the long pins, and tip and ring to the central office equipment via the short pins. When the solid-state overvoltage protector (SSOVP) module 500 is fully inserted into the connector base, the outside plant and the central office pairs are connected together. The 5-pin module is designed to short-to-ground (also known as a "fail-short event") when it encounters lightning, power cross or other electrical conditions that exceed the surge capabilities of the SSOVP device. Similarly, the SSOVP switches may be replaced with gas tubes having a fail-short mechanism that shunts transient voltages to ground for gas tube overvoltage type protector modules.

The inventors recognize that the current design of surge protector modules, while suitable for providing POTS service, are not suitable for providing high speed digital subscriber line (DSL) services outside of large host offices due to the noise received by the serving DSL pair as it traverses the office.

Accordingly, the disclosed embodiments seek to address the problem by allowing for the bypass of untwisted office wiring. For instance, in one embodiment, a surge protection module is modified by integrating a splitter/combiner module into the surge protection module. DSL service is then delivered to the surge protection module via high speed twist wire. The high speed twist wire reduces noise by canceling electromagnetic interference (EMI) from external sources. The DSL signal and a POTS signal are combined inside the surge protection module using the integrated splitter for providing subscribers both POTS and DSL services.

Figure 6:
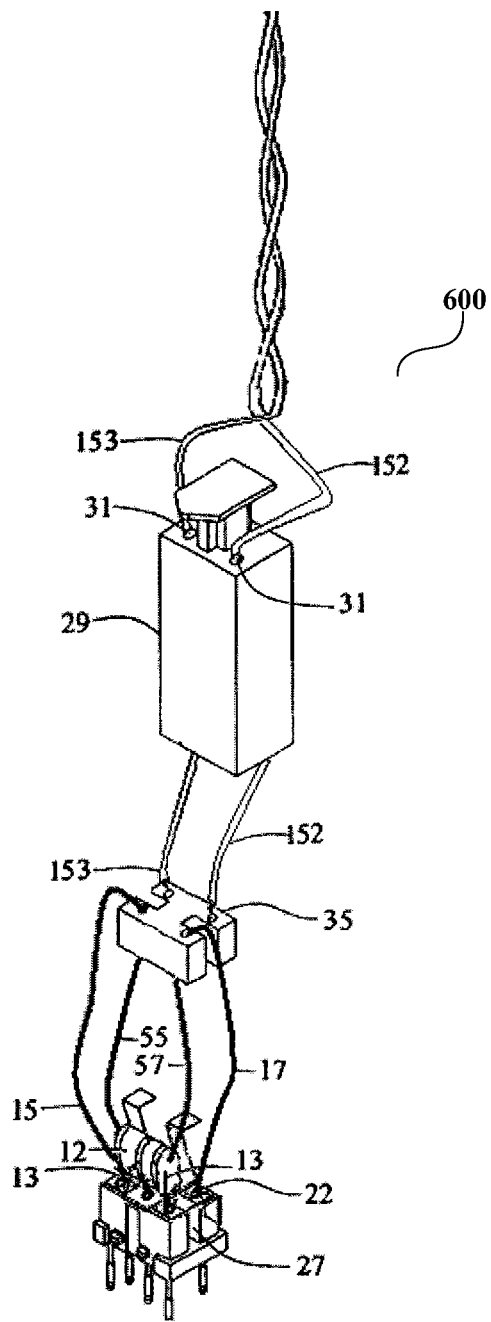
FIG. 6 illustrates a modified surge protection module having an integrated splitter in accordance with the disclosed embodiments.

For example, with reference now to FIG. 6, a modified surge protection module 600 having an integrated splitter 35 is disclosed in accordance with one embodiment. A splitter as known in the art is a component/device that may be used to split a signal and/or combine one or more signals. In this embodiment, a DSL twisted wire wrap line consisting of a DSL Tip wire 152 and a DSL Ring wire 153 is delivered directly into the modified surge protection module 600 via the apertures 31 and connected to the integrated splitter 35. The electrical connection (15 and 17) from the two pins corresponding to the central office (CO) POTS tip and ring are rerouted to the integrated splitter 35. The integrated splitter 35 combines the signals of the DSL Tip wire 152 with the signal of the central office POTS tip 17 and outputs the combined signal via an electrical connection 17 to the gas tube 12. Similarly, the integrated splitter 35 combines the signals of the DSL Tip wire 153 with the signal of the central office POTS ring 15 and outputs the combined signal via an electrical connection 15 to the gas tube 12.

Figure 6A:
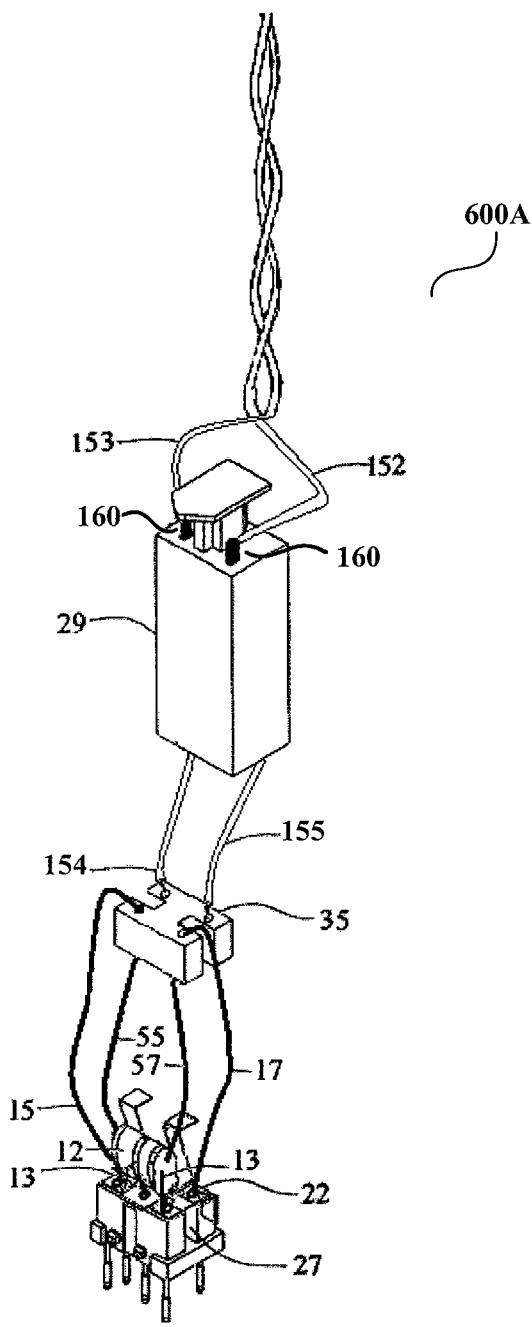
FIG. 6A illustrates a second modified surge protection module having an integrated splitter in accordance with the disclosed embodiments.

FIG. 6A illustrates a second modified surge protection module 600A having an integrated splitter 35 in accordance with the disclosed embodiments. The modified surge protection module 600A is similar to the modified surge protection module 600, except the modified surge protection module 600A includes a pair of wire wrap pins 160 on the face of the protector housing 29 for connecting the DSL twisted wire wrap line consisting of a DSL Tip wire 152 and a DSL Ring wire 153 externally to the modified surge protection module 600A. The pair of wire wrap pins 160 is connected internally to the integrated splitter 35 via internal connections 154 and 155.

Figure 7:
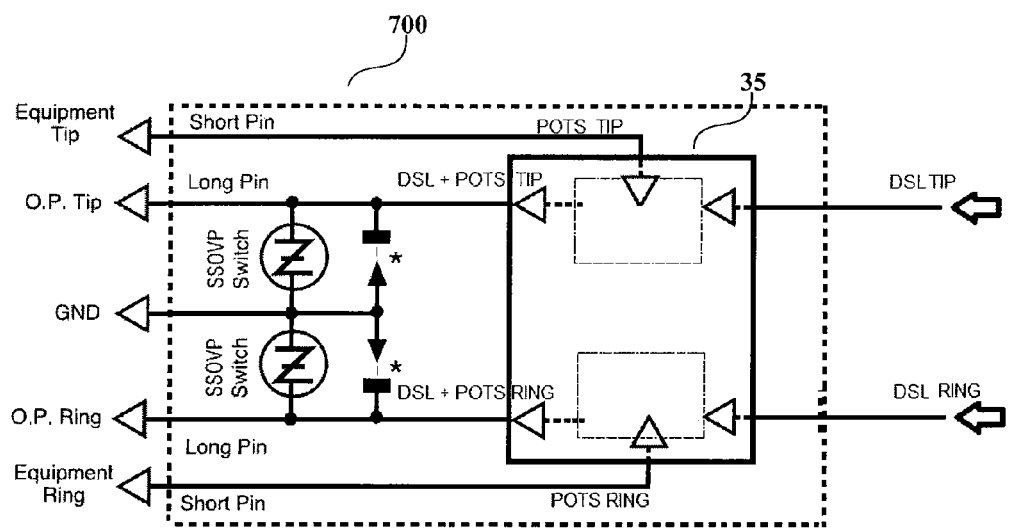
FIG. 7 illustrates an example of a circuit diagram of a modified surge protection module having an integrated splitter in accordance with the disclosed embodiments.

FIG. 7 illustrates an example of a circuit diagram 700 of the modified surge protection module 600 having the integrated splitter 35. As depicted in the diagram, the electrical connection to the short pins of the modified surge protection module, which were previously connected to the POTS tip and ring, have been rerouted to the integrated splitter 35. The integrated splitter 35 combines the respective signals of the POTS tip and ring with the respective signals the DSL tip and ring from the DSL wire wrap through the front face of the modified surge protection module 600. The integrated splitter 35 outputs the combined DSL/POTS tip and ring signals. Thus, when the modified surge protection module 600 is fully inserted into the connector base, both DSL and POTS service is provided to the customer via a DSL twisted wire wrap to eliminate/reduce noise interference.

Figure 8:
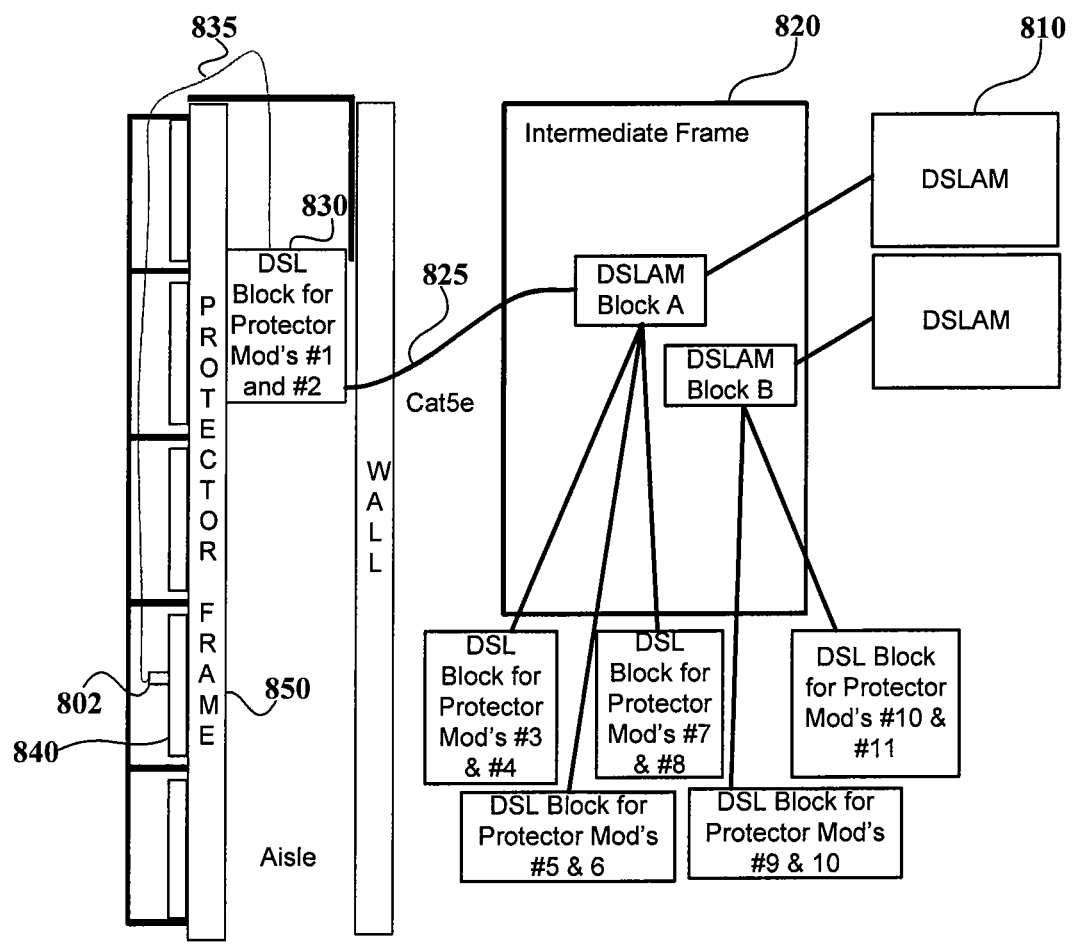
FIG. 8 is a block diagram illustrating an example of the connection between a modified surge protection module having an integrated splitter and central office equipment in accordance with the disclosed embodiments.

FIG. 8 is a block diagram illustrating an example of the connection between a modified surge protection module 802 and central office equipment in accordance with the disclosed embodiments. The modified surge protection module 802 has an integrated splitter as described above. In the depicted embodiment, DSL service is provided by a digital subscriber line access multiplexer (DSLAM) device 810 of a main distribution frame (MDF). The DSLAM device 810 handles the high-speed digital data streams coming from numerous subscribers' DSL modems and aggregates it onto a single high-capacity uplink—ATM or Gigabit Ethernet.

The DSLAM 810 may be connected to one or more DSLAMs of an intermediate distribution frame (IDF) 820. The intermediate distribution frame 820 may be a free-standing or wall-mounted rack for managing and interconnecting the telecommunications cable between end user devices and the main distribution frame. From there, a Cat5e, or other suitable cabling 825, is used to connect to a DSL Block 830.

A DSL twisted pair wire wrap line 835 consisting of a DSL Tip wire and a DSL Ring wire is delivered directly into the modified surge protection module 802 via the face of the modified surge protector module 802 as illustrated in FIG. 6. The DSL Tip wire and the DSL Ring wire are connected to an integrated splitter, which combines the DSL signal with the POTS signal as described above.

The modified surge protector module 802 is then inserted into a central office rack mount protector block 840 (as illustrated in FIG. 3) for completing the connection between the CO equipment lines and the outside plant (OP) lines. A rigid bracket 838 may be coupled to the central office protector frame 850 for providing a means for supporting and/or organizing a plurality of the twisted pair wire wrap lines.

Accordingly, the above embodiments described a system and method of utilizing a modified surge protection module having an integrated splitter for providing for high speed digital subscriber line (DSL) services. Advantages of the disclosed embodiments include, but are not limited to, reducing or eliminating noise that affects the DSL service.

While the above description describes various embodiments, the disclosed description is not intended to limit the structure or implementation of the disclosed embodiments. One of ordinary skill in the art would recognize that various modifications may be made and that the teachings disclosed herein may be implemented in various forms and may be applied to numerous applications. For instance, while the depicted embodiment in FIG. 6 illustrates a modification to a gas tube surge protection module, a similar modification may be made to a solid-state overvoltage protector (SSOVP) module.

Accordingly, it is intended by the following claims to claim any and all applications, modifications, and variations of the present teachings that fall within the scope of the appended claims.

We claim:

1. A surge protection module comprising:
an overvoltage protection component;
a ground pin configured on a bottom end of the surge protection module, the ground pin in electrical communication with the overvoltage protection component;
a pair of outside plant tip and ring pins configured on the bottom end of the surge protection module, the pair of outside plant tip and ring pins in electrical communication with the overvoltage protection component;
a pair of plain old telephone service (POTS) tip and ring pins configured on the bottom end of the surge protection module;
a cover having apertures configured to receive a wire wrap pair consisting of a digital subscriber line (DSL) tip wire and a DSL ring wire;
an integrated signal splitter configured to connect to the DSL tip wire, the DSL ring wire, and the POTS tip and ring pins, wherein the integrated signal splitter is further configured to combine a first signal from the DSL tip wire with a second signal from the POTS tip pin to generate a DSL/POTS tip output signal, and combine a third signal from the DSL ring wire with a fourth signal from the POTS ring pin to generate a DSL/POTS ring output signal; and
wherein the integrated signal splitter is configured to be in electrical communication with the overvoltage protection component and to output the DSL/POTS tip output signal and the DSL/POTS ring output signal to the overvoltage protection component.

2. The surge protection module of claim 1, wherein the POTS tip and ring pins, the pair of outside plant tip and ring pins, and the ground pin are configured in an industry standard 5 pin configuration for surge protection modules, wherein the 5 pin configuration consists of 3 long pins and 2 short pins.

3. The surge protection module of claim 1, wherein the apertures are located on a top face of the cover, the top face being opposite direction of the bottom end of the surge protection module.

4. The surge protection module of claim 1, wherein the overvoltage protection component is a gas tube.

5. The surge protection module of claim 1, wherein the overvoltage protection component is a solid-state overvoltage protector (SSOVP).

6. The surge protection module of claim 1, wherein the pair of outside plant tip and ring pins are a pair of long pins.

7. The surge protection module of claim 1, wherein the pair of outside plant tip and ring pins are a pair of short pins.

8. A surge protection module comprising:
an overvoltage protection component;
a ground pin configured on a bottom end of the surge protection module, the ground pin in electrical communication with the overvoltage protection component;
a pair of outside plant tip and ring pins configured on the bottom end of the surge protection module, the pair of outside plant tip and ring pins in electrical communication with the overvoltage protection component;
a pair of plain old telephone service (POTS) tip and ring pins configured on the bottom end of the surge protection module;
a pair of wire wrap pins on a front face of the surge protection module configured to receive a wire wrap pair consisting of a digital subscriber line (DSL) tip wire and a DSL ring wire;
an integrated signal splitter configured to combine a first signal from the DSL tip wire with a second signal from the POTS tip pin to generate a DSL/POTS tip output signal, and combine a third signal from the DSL ring wire with a fourth signal from the POTS ring pin to generate a DSL/POTS ring output signal; and
wherein the integrated signal splitter is configured to be in electrical communication with the overvoltage protection component and to output the DSL/POTS tip output signal and the DSL/POTS ring output signal to the overvoltage protection component.

9. The surge protection module of claim 8, wherein the POTS tip and ring pins, the pair of outside plant tip and ring pins, and the ground pin are configured in an industry standard 5 pin configuration for surge protection modules, wherein the 5 pin configuration consists of 3 long pins and 2 short pins.

10. The surge protection module of claim 8, wherein the overvoltage protection component is a gas tube.

11. The surge protection module of claim 8, wherein the overvoltage protection component is a solid-state overvoltage protector (SSOVP).

12. The surge protection module of claim 8, wherein the pair of outside plant tip and ring pins are a pair of long pins.

13. The surge protection module of claim 8, wherein the pair of outside plant tip and ring pins are a pair of short pins.

* * * * *